US011136066B2

(12) United States Patent
Yamazaki et al.

(10) Patent No.: US 11,136,066 B2
(45) Date of Patent: Oct. 5, 2021

(54) VEHICLE SIDE BODY STRUCTURE

(71) Applicant: Mazda Motor Corporation, Hiroshima (JP)

(72) Inventors: Tadashi Yamazaki, Hiroshima (JP); Takeshi Nakamura, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/812,698

(22) Filed: Mar. 9, 2020

(65) Prior Publication Data

US 2020/0398900 A1    Dec. 24, 2020

(30) Foreign Application Priority Data

Jun. 18, 2019  (JP) .............................. JP2019-112695

(51) Int. Cl.
*B62D 25/02*  (2006.01)
*B62D 25/04*  (2006.01)
*B62D 27/02*  (2006.01)

(52) U.S. Cl.
CPC .......... *B62D 25/04* (2013.01); *B62D 25/025* (2013.01); *B62D 27/02* (2013.01)

(58) Field of Classification Search
CPC ...... B62D 25/02; B62D 25/04; B62D 25/025; B62D 27/02; B62D 27/023
USPC .................. 296/193.06, 203.03, 209, 187.12
See application file for complete search history.

(56) References Cited

U.S. PATENT DOCUMENTS

| 8,439,428 | B2 * | 5/2013 | Imamura | ............... B60J 5/0429 |
| | | | | 296/193.05 |
| 8,720,984 | B2 * | 5/2014 | Kurogi | ................ B62D 25/025 |
| | | | | 296/205 |
| 10,150,511 | B2 * | 12/2018 | Iyoshi | .................... B62D 25/20 |

(Continued)

FOREIGN PATENT DOCUMENTS

| JP | 6197841 B2 | 9/2017 |
| JP | 2018-118697 A | 8/2018 |
| WO | 2015033714 A1 | 3/2015 |

OTHER PUBLICATIONS

European Patent Office, Extended European Search Report Issued in Application No. 20162589.4, dated Sep. 22, 2020, Germany, 7 pages.

*Primary Examiner* — Dennis H Pedder
(74) *Attorney, Agent, or Firm* — Alleman Hall Creasman & Tuttle LLP (57) ABSTRACT

To improve bending rigidity of a side sill against an inward load during a lateral collision while suppressing a weight increase of the side sill, a vehicle side body structure includes a side sill that has a closed cross-sectional space extending in a vehicle longitudinal direction and a center pillar. A pillar inner provided in the center pillar has a pillar inner upper and a pillar inner lower. In a longitudinal direction of the side sill, an overlapping portion in which the pillar inner upper and the pillar inner lower overlap each other in side view in the closed cross-sectional space of the side sill is provided. The closed cross-sectional space further includes sections, each of which partitions the closed cross-sectional space in the longitudinal direction. These sections are joined to the overlapping portion and an inner surface, which faces the closed cross-sectional space, in the side sill.

13 Claims, 4 Drawing Sheets

(56) References Cited

U.S. PATENT DOCUMENTS

| | | | |
|---|---|---|---|
| 2010/0207426 A1* | 8/2010 | Tsuruta | B62D 25/02 296/187.12 |
| 2011/0285175 A1* | 11/2011 | Imamura | B62D 21/157 296/193.05 |
| 2013/0049405 A1* | 2/2013 | Kurogi | B62D 25/06 296/203.01 |
| 2013/0049408 A1* | 2/2013 | Kurogi | B62D 25/025 296/209 |
| 2016/0194034 A1 | 7/2016 | Emura | |
| 2017/0297628 A1 | 10/2017 | Iyoshi et al. | |

* cited by examiner

VEHICLE SIDE BODY STRUCTURE

TECHNICAL FIELD

The present invention relates to a vehicle side body structure including: a side sill that has a closed cross-sectional structure extending in a vehicle longitudinal direction; and a center pillar that has a closed cross-sectional structure extending upward from the side sill, and being formed with an opening at a position above the side sill and on each of front and rear sides of the center pillar.

BACKGROUND ART

During a lateral collision of a vehicle (hereinafter referred to as a "lateral collision"), depending on a colliding position of a colliding object with a vehicle side surface, a side sill receives a load toward an inner side in a vehicle width direction (that is, a load causing such bending deformation that a joined portion of the side sill to the center pillar in a longitudinal direction is displaced toward the inner side in the vehicle width direction in a vehicle plan view) in conjunction with the load applied from a center pillar toward the inner side in the vehicle width direction.

Accordingly, instead of locally receiving the load toward the inner side in the vehicle width direction by the center pillar joined portion joined to the center pillar, the side sill preferably receives the load in a wide area including a peripheral portion on each of vehicle front and rear sides of the center pillar joined portion and a peripheral portion below the center pillar joined portion, which is located in an upper portion of the side sill, in order to contribute to improvement in bending rigidity of the side sill against the load toward the inner side in the vehicle width direction or suppress an amount of entry into the inner side in the vehicle width direction even when bending deformation occurs.

Meanwhile, with increased needs for a light vehicle body weight for purposes of improving fuel economy and improving travel performance in recent years, a weight reduction of a vehicle body (the side sill) is desired while safety of an occupant against the lateral collision is secured.

Thus, it is preferred that, with the simplest structure as possible, the load toward the inner side in the vehicle width direction applied to the side sill during the lateral collision is received by the wide area including the portions around the center pillar joined portion of the side sill as described above while an increase in the number of components is suppressed.

PRIOR ART DOCUMENTS

Patent Documents

Patent document 1: JP 2018-118697A

SUMMARY OF THE INVENTION

Problem to be Solved by the Invention

The present invention has been made in view of such a problem and therefore has a purpose of providing a vehicle side body structure capable of improving bending rigidity against an inward load in a vehicle width direction during a lateral collision while suppressing a weight increase of a side sill.

Means for Solving the Problem

The present invention is a vehicle side body structure including: a side sill that has a closed cross-sectional structure extending in a vehicle longitudinal direction; and a center pillar that has a closed cross-sectional structure extending upward from the side sill, and being formed with an opening at a position above the side sill and on each of front and rear sides of the center pillar. The center pillar includes a pillar inner and a pillar outer. The pillar inner has a pillar inner upper and a pillar inner lower provided on a lower side of the pillar inner upper. In a longitudinal direction of the side sill, in a center pillar arrangement region where the center pillar is located, the pillar inner upper and the pillar inner lower overlap each other on the inside of a closed cross-section of the side sill in a vehicle side view. A section that partitions the inside of the closed cross-section in the longitudinal direction is provided on the inside of the closed cross-section. The section is joined to an overlapping portion between the pillar inner upper and the pillar inner lower and to an inner surface, which faces the inside of the closed cross-section, in the side sill.

With the above configuration, it is possible to improve bending rigidity against an inward load in a vehicle width direction during a lateral collision while suppressing a weight increase of the side sill.

As an aspect of the present invention, in the longitudinal direction of the side sill, the overlapping portion at least has a length in the vehicle longitudinal direction that corresponds to the center pillar arrangement region, the section is one of a plurality of sections separately provided on front and rear sides of the overlapping portion, and each of the plurality of sections is provided on an outer side of the overlapping portion in the vehicle width direction and, of the pillar inner upper and the pillar inner lower, is only joined to a member located on the outer side in the vehicle width direction in the overlapping portion.

With the above configuration, of the pillar inner upper and the pillar inner lower, each of the sections is only joined to the member located on the outer side in the vehicle width direction in the overlapping portion. In addition thereto, the load toward the inner side in the vehicle width direction is applied to the side sill during the lateral collision. Accordingly, when the side sill presses the overlapping portion to the inner side in the vehicle width direction via the sections, the section can press the member, which is located on the outer side in the vehicle width direction, in the overlapping portion to a side of the member located on a cabin inner side.

Thus, since the pillar inner upper and the pillar inner lower overlap each other in the vehicle width direction, the overlapping portion can be pressed in a direction to increase a joint force to each other by the sections during the lateral collision. Therefore, the sections and the overlapping portion can securely receive the load toward the inner side in the vehicle width direction during the lateral collision such that the side sill is not displaced toward the inner side in the vehicle width direction.

As an aspect of the present invention, at least in the overlapping portion, each of the pillar inner upper and the pillar inner lower is provided with a bead in a shape to be projected in the vehicle width direction, and the beads of the pillar inner upper and the pillar inner lower are formed at overlapping positions in the vehicle side view to have shapes to be projected in the same direction in the vehicle width direction.

With the above configuration, it is possible to improve rigidity of the overlapping portion against the inward load in the vehicle width direction during the lateral collision by forming the beads in the overlapping portion.

Advantage of the Invention

According to the present invention, it is possible to improve the bending rigidity against the inward load in the vehicle width direction during the lateral collision while suppressing a weight increase of the side sill.

MODES FOR CARRYING OUT THE INVENTION

A detailed description will hereinafter be made on an embodiment of the present invention with reference to the drawings. In the drawings, an arrow F, an arrow U, and an arrow OUT respectively indicate a vehicle front direction, a vehicle up direction, and an outer side in a vehicle width direction (a vehicle right direction). In addition, in the following description, the outer side in the vehicle width direction (a cabin outer side) will be referred to as a vehicle width outer side, and an inner side in the vehicle width direction (a cabin inner side) will be referred to as a vehicle width inner side. Note that a vehicle side body structure of this embodiment, which will be described below, is provided substantially and bilaterally symmetrical on left and right sides of a vehicle.

Figure 1:
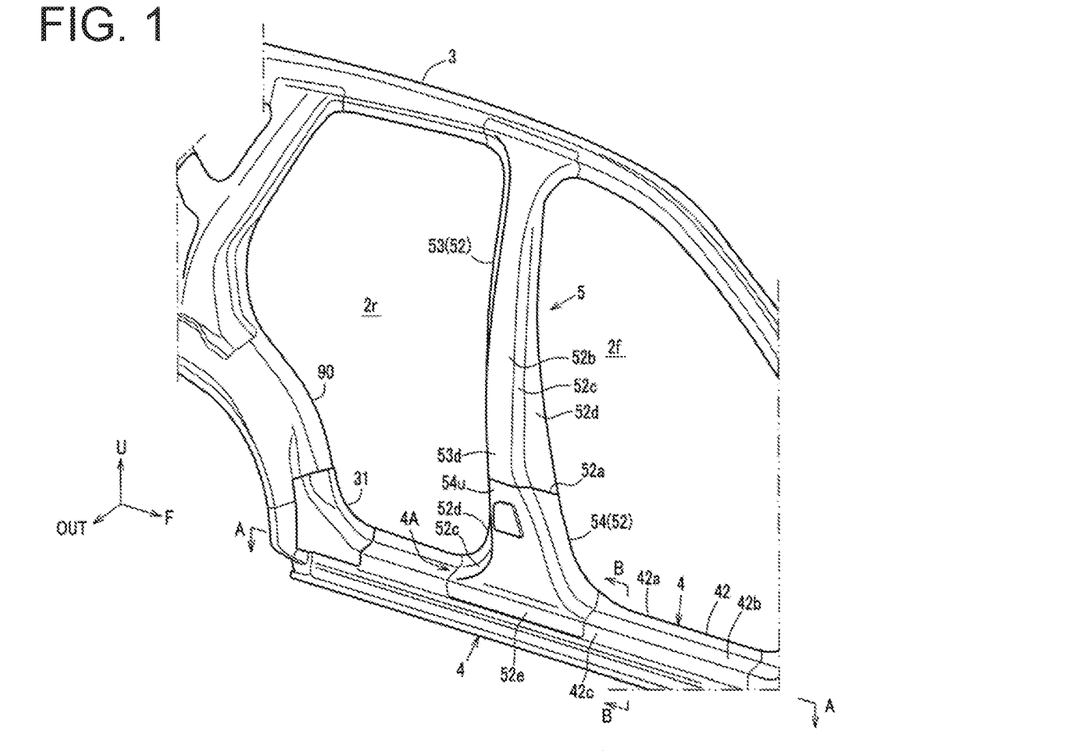
FIG. 1 is a perspective view in which a main section of a vehicle having a vehicle side body structure in this embodiment is seen from a right side of a vehicle body.

As illustrated in FIG. 1, side openings $2f$, $2r$ are formed in a vehicle side body portion. A roof side rail 3 that extends in a longitudinal direction is provided along upper sides of the side openings $2f$, $2r$. A side sill 4 that extends in the longitudinal direction is provided along lower sides of the side openings $2f$, $2r$.

A center pillar 5 that extends in a vertical direction is provided at an intermediate position between the side openings $2f$, $2r$ in a vehicle longitudinal direction. In the center pillar 5, an upper end is joined to an intermediate portion of the roof side rail 3, which extends in the vehicle longitudinal direction, and a lower end is joined to an intermediate portion of the side sill 4, which extends in the vehicle longitudinal direction.

In this way, the side openings $2f$, $2r$ are partitioned into openings on vehicle front and rear sides by the center pillar 5 and are provided as entry and exit openings $2f$, $2r$ (the front entry and exit opening $2f$ and the rear entry and exit opening $2r$).

The vehicle side body portion includes side doors that respectively open and close the front and rear entry and exit openings $2f$, $2r$. In FIG. 1, the side doors are not illustrated.

Figure 5:
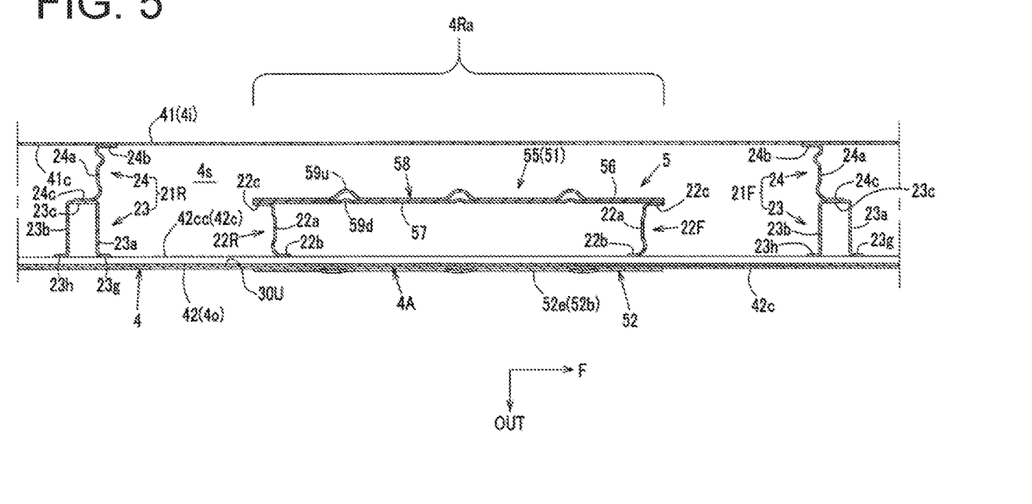
FIG. 5 is a cross-sectional view of the main section taken along line A-A in FIG. 1.
Figure 7:
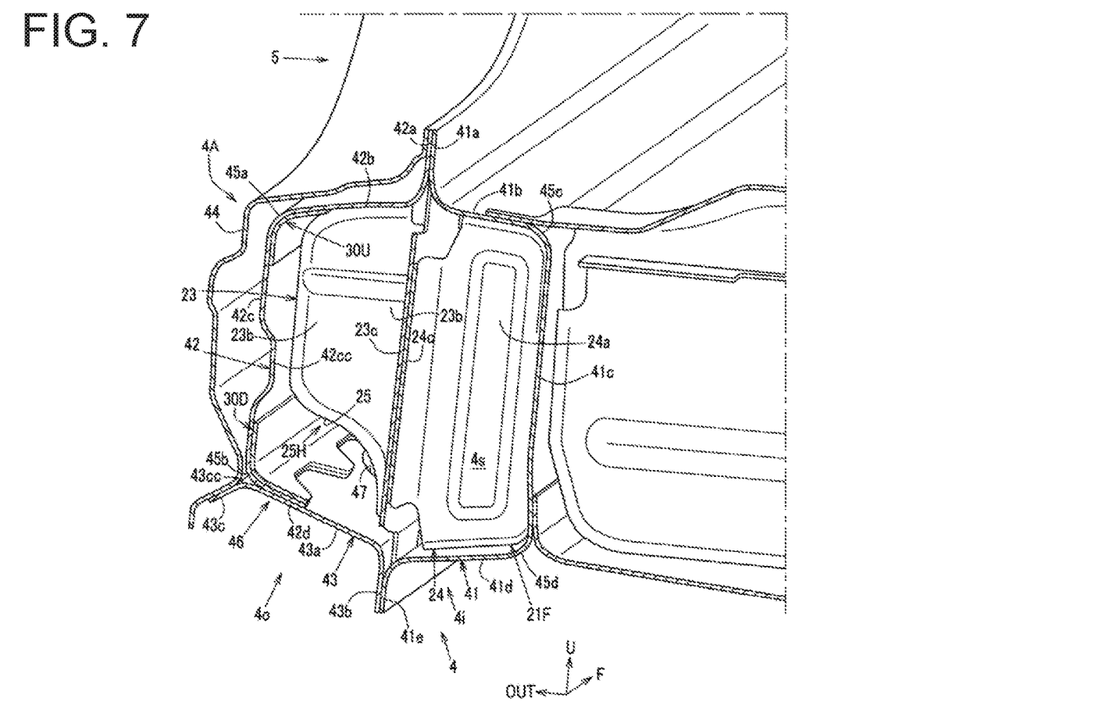
FIG. 7 is a perspective cross-sectional view of the main section of the vehicle side body structure corresponding to an arrow direction of B-B in FIG. 1.

As illustrated in FIG. 5 and FIG. 7, the side sill 4 is a vehicle body rigid member that has a closed cross-sectional space $4s$ extending in the vehicle longitudinal direction, and, as illustrated in FIG. 7, includes: a first member 41, a second member 42, and a third member 43 constituting the closed cross-sectional space $4s$; and an exterior panel 44 (only illustrated in FIG. 7) attached to the vehicle width outermost side of the side sill 4.

As a side sill inner $4i$ formed in a hat shape whose perpendicular cross-section to the vehicle longitudinal direction is projected to the vehicle width inner side, the first member 41 is provided on the vehicle width inner side of the side sill 4. More specifically, the first member 41 is integrally formed by including an upper end flange $41a$ extending in the vertical direction, an upper wall $41b$ extending to the vehicle width inner side from a lower end of the upper end flange $41a$, an inner wall $41c$ extending downward from a vehicle width inner end of the upper wall $41b$, a lower wall $41d$ extending to the vehicle width outer side from a lower end of the inner wall $41c$, and a lower end flange $41e$ extending downward from a vehicle width outer end of the lower wall $41d$.

As a side sill outer $4o$ formed in a hat shape whose perpendicular cross-section to the vehicle longitudinal direction is projected to the vehicle width outer side, the second member 42 and the third member 43 are provided on the vehicle width outer side of the first member 41.

More specifically, the second member 42 is integrally formed by including an upper end flange $42a$ located in an upper portion and an intermediate portion in the vertical direction of the side sill outer $4o$ and extending in the vertical direction, an upper wall $42b$ extending to the vehicle width outer side from a lower end of the upper end flange $42a$, an outer wall $42c$ extending downward from an vehicle width outer end of the upper wall $42b$, and a lower end flange $42d$ extending to the vehicle width inner side from a lower end of the outer wall $42c$. The third member 43 is integrally formed by including a lower wall $43a$ located in a lower portion of the side sill outer $4o$ and extending to the vehicle width inner side and a lower end flange $43b$ extending downward from a vehicle width inner end of the lower wall $43a$.

The upper end flanges $41a$, $42a$ of the first member 41 and the second member 42 as well as the lower end flanges $41e$, $43b$ of the first member 41 and the third member 43 are integrally joined to each other by spot welding or the like. Furthermore, the lower end flange $42d$ of the second member 42 is joined to the lower wall $43a$ of the third member 43 from above (a side of the closed cross-sectional space $4s$).

In this way, the side sill 4 constitutes the closed cross-sectional space $4s$ therein by the upper wall $41b$, the inner wall $41c$, and the lower wall $41d$ of the first member 41, the upper wall $42b$ and the outer wall $42c$ of the second member 42, and the lower wall $43a$ of the third member 43. In addition, in the side sill 4, ridgelines $45a$, $45b$, $45c$, $45d$ extending in the vehicle longitudinal direction are respectively defined between the upper wall $42b$ and the outer wall $42c$, the outer wall $42c$ and the lower end flange $42d$, the upper wall $41b$ and the inner wall $41c$, and the inner wall $41c$ and the lower wall $41d$. Of these ridgelines $45a$, $45b$, $45c$, $45d$, the ridgeline $45a$ defined between the upper wall $42b$ and the outer wall $42c$, that is, the ridgeline $45a$ defined at an upper end of the outer wall $42c$ is set as an upper outer ridgeline $45a$, and the ridgeline $45b$ defined between the outer wall $42c$ and the lower end flange $42d$, that is, the ridgeline $45b$ defined at the lower end of the outer wall $42c$ is set as a lower outer ridgeline $45b$.

As illustrated in FIG. 7, the outer wall $42c$ of the side sill 4 is provided with an outer wall bead $42cc$, which is dented to the side of the closed cross-sectional space 4s, near a center in the vertical direction.

Figure 8:
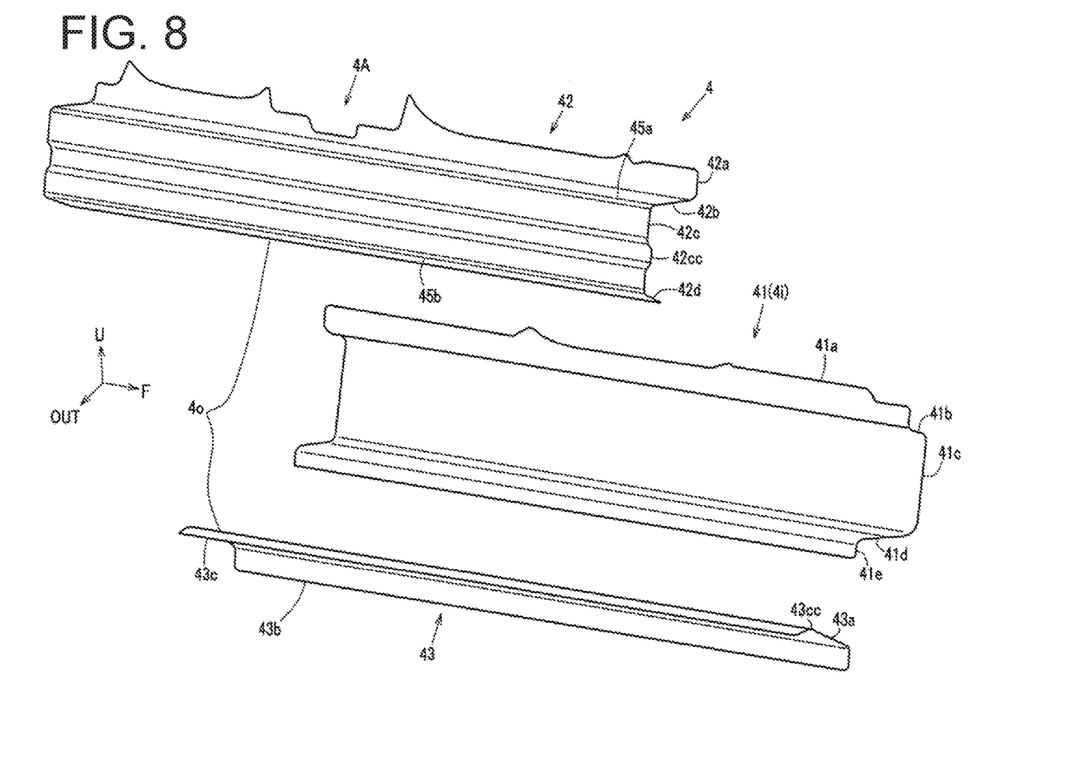
FIG. 8 is an exploded perspective view of a main section of the side sill.

As illustrated in FIG. 1, FIG. 7, and FIG. 8, the third member 43 is further formed with a vehicle width outer end flange 43c extending to the vehicle width outer side from a vehicle width outer end of the lower wall 43a. This vehicle width outer end flange 43c extends to the vehicle width outer side from an upper end portion of an overlapping portion 46 between the lower end flange 42d of the second member 42 and the lower wall 43a of the third member 43.

In a cross-sectional view that is perpendicular to the longitudinal direction of the side sill 4, the vehicle width outer end flange 43c is projected downward and to the vehicle width outer side from a position between the outer wall 42c and the lower wall 43a of the side sill 4 in a manner to be curved with respect to these outer wall 42c and lower wall 43a. In this way, a ridgeline 43cc extending in the vehicle longitudinal direction is defined in a base end portion of the vehicle width outer end flange 43c.

In the cross-sectional view that is perpendicular to the longitudinal direction of the side sill 4, this ridgeline 43cc matches or is located near the above-described lower outer ridgeline 45b. In the present example, the ridgeline 43cc located in the base end portion of the vehicle width outer end flange 43c is located under and near the lower outer ridgeline 45b.

Figure 3:
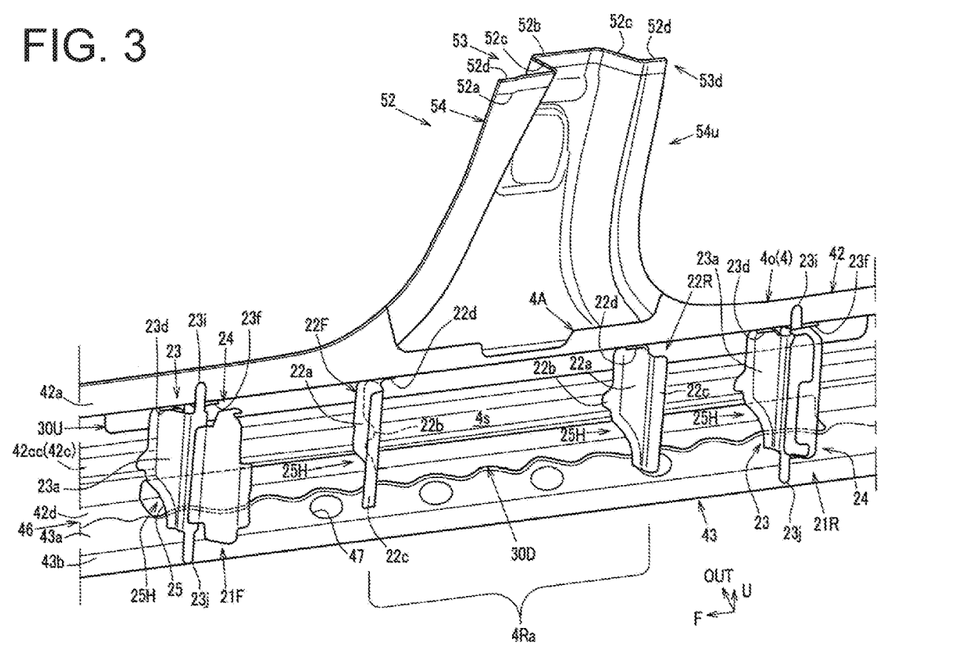
FIG. 3 is a perspective view in which a pillar inner is removed from FIG. 2.

Moreover, as illustrated in FIG. 3, the lower wall 43a of the third member 43 in the side sill 4 is formed with a plurality of through holes 47, each of which has a substantially circular shape in a plan view, along the vehicle longitudinal direction. Each of these through holes 47 is used to insert a corrosion inhibitor spray gun (not illustrated) in the closed cross-sectional space 4s in order to introduce an electrodeposition liquid or the like into the closed cross-sectional space 4s of the side sill 4 or spraying a corrosion inhibitor on an inner surface that faces the closed cross-sectional space 4s of the side sill 4.

As illustrated in FIG. 3, FIG. 5, and FIG. 7, the side sill 4 includes sections 21F, 21R, 22F, 22R, each of which partitions the closed cross-sectional space 4s in the vehicle longitudinal direction.

The sections 21F, 21R, 22F, 22R are provided along the vehicle longitudinal direction of the side sill 4. In the present example, the sections 21F, 21R, 22F, 22R are at least provided at four positions in a front portion and a rear portion of a center pillar arrangement region 4Ra and a portion in front of and a portion behind the center pillar arrangement region 4Ra in the longitudinal direction of the side sill 4.

These sections 21F, 21R, 22F, 22R are set as a pillar forward section 21F, a pillar front section 22F, a pillar rear section 22R, and a pillar rearward section 21R in an order from a front side to a rear side.

As illustrated in FIG. 3 and FIG. 5, a pair of the pillar forward section 21F and the pillar rearward section 21R and a pair of the pillar front section 22F and the pillar rear section 22R are each disposed in a substantially symmetrical shape about a center axis of the center pillar 5 extending in the vertical direction. Thus, a configuration of each of the sections 21F, 21R, 22F, 22R and joining thereof to the side sill 4 and the like will be described based on the pillar forward section 21F and the pillar front section 22F.

As illustrated in the same drawings, the pillar front section 22F is disposed on the vehicle width outer side of the closed cross-sectional space 4s of the side sill 4, that is, only on a side of the side sill outer 4o (the second member 42 and the third member 43) among the side sill outer 4o and the side sill inner 4i, and is integrally formed by including a vertical wall 22a that partitions the closed cross-sectional space 4s in the vehicle longitudinal direction, an outer end flange 22b extending rearward from a vehicle width outer end of the vertical wall 22a, an inner end flange 22c extending forward from a vehicle width inner end of the vertical wall 22a, and an upper end flange 22d (see FIG. 3) extending rearward from an upper end of the vertical wall 22a.

As illustrated in FIG. 3 and FIG. 5, in the pillar front section 22F, the outer end flange 22b is joined to the outer wall bead 42cc in the outer wall 42c of the second member 42 in the side sill 4, the upper end flange 22d (see FIG. 3) is joined to the upper wall 42b (see FIG. 7) of the second member 42 in the side sill 4, and the inner end flange 22c (see FIG. 5) is joined to a lower portion (that is, an extending portion 55 described later) of a pillar inner 51, which will be described later.

As illustrated in FIG. 3, FIG. 5, FIGS. 6A, 6B, and FIG. 7, the pillar forward section 21F is constructed of an outer section component 23 located on the vehicle width outer side and an inner section component 24 located on the vehicle width inner side.

The outer section component 23 is integrally formed to have a double-wall structure in a gate shape in a plan view by including a front wall 23a and a rear wall 23b separately disposed in the vehicle longitudinal direction and an inner wall 23c coupling vehicle width outer ends of these front wall 23a and rear wall 23b in the vehicle longitudinal direction. Furthermore, the front wall 23a is integrally formed with a front wall upper end flange 23d extending forward from an upper end and a front wall outer end flange 23g extending forward from an outer end in the vehicle width direction. The rear wall 23b is integrally formed with a rear wall upper end flange 23f extending rearward from an upper end and a rear wall outer end flange 23h extending rearward from an outer end in the vehicle width direction. Moreover, the inner wall 23c is integrally formed with an upper end flange 23i extending upward from an upper end thereof and a lower end flange 23j extending downward from a lower end thereof.

As illustrated in the same drawings, the inner section component 24 is integrally formed by including a vertical wall 24a extending in the vertical direction and the vehicle width direction, a vehicle width inner end flange 24b extending rearward from a vehicle width inner end of the vertical wall 24a, a vehicle width outer end flange 24c extending forward from a vehicle width outer end of the vertical wall 24a, an upper end flange 24d extending rearward from an upper end of the vertical wall 24a, and a lower end flange 24e extending rearward from a lower end of the vertical wall 24a.

Figure 6A:
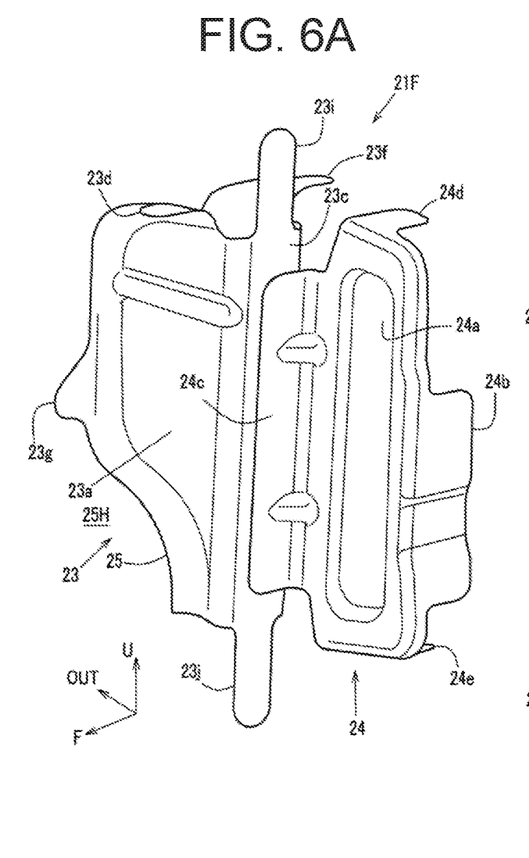
FIGS. 6A and 6B include perspective views in a pillar forward section as seen from the front and behind.
Figure 6B:
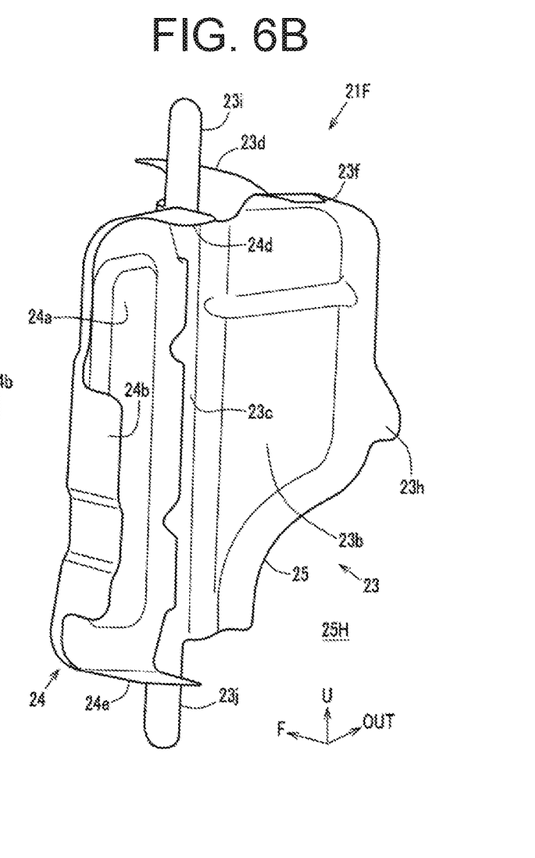

In the pillar forward section 21F, the inner wall 23c of the outer section component 23 and the vehicle width outer end flange 24c of the inner section component 24 are integrally joined to each other by welding or the like.

Just as described, the pillar forward section 21F and the pillar rearward section 21R each includes the outer section component 23 formed in the double-wall structure in the plan view. Thus, each of the pillar forward section 21F and the pillar rearward section 21R is provided to have higher rigidity against misshaping of a cross-section of the side sill 4, which is associated with application of the load toward the vehicle width inner side to the center pillar 5, than the pillar front section 22F and the pillar rear section 22R.

As illustrated in FIG. 3, FIG. 5, and FIG. 7, in the pillar forward section 21F, the upper end flanges 23d, 23f of the outer section component 23 are joined to the upper wall 42b (see FIG. 7) of the second member 42 in the side sill 4, and the front wall outer end flange 23g and the rear wall outer end flange 23h of the outer section component 23 are joined to the outer wall bead 42cc in the outer wall 42c of the second member 42 in the side sill 4 (see FIG. 5). Furthermore, the upper end flange 24d (see FIG. 5) of the inner section component 24 is joined to the upper wall 41b (see FIG. 7) of the first member 41 in the side sill 4. The vehicle width inner end flange 24b (see FIG. 5) of the inner section component 24 and the lower end flange 24e (see FIGS. 6A, 6B) of the inner section component 24 are respectively joined to the inner wall 41c (see FIG. 7) and the lower wall 41d.

Figure 2:
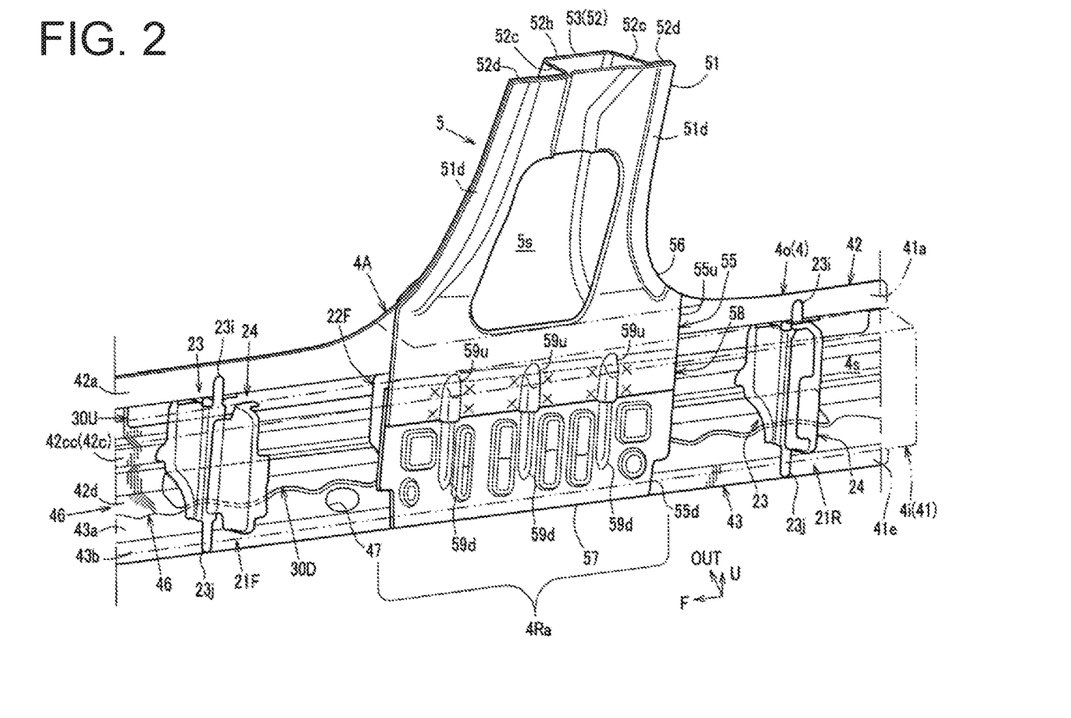
FIG. 2 is a perspective view in which a side sill inner is removed and a joined portion between a side sill and a center pillar and a portion therearound are seen from a vehicle width inner side.

As illustrated in FIG. 2, the upper end flange 23i in a tongue-piece shape provided in the outer section component 23 of the pillar forward section 21F is held between the upper end flanges 41a, 42a of the first member 41 and the second member 42 in the side sill 4 and is integrally joined to these upper end flanges 41a, 42a.

Similarly, the lower end flange 23j in a tongue-piece shape provided in the outer section component 23 of the pillar forward section 21F is held between the lower end flanges 41e, 43b of the first member 41 and the third member 43 in the side sill 4 and is integrally joined to these lower end flanges 41e, 43b.

As illustrated in FIG. 5, the pillar front section 22F and the pillar rear section 22R described above each partition the vehicle width outer side of the closed cross-sectional space 4s by the vertical wall 22a. The pillar forward section 21F and the pillar rearward section 21R each partition the vehicle width outer side of the closed cross-sectional space 4s by the front wall 23a and the rear wall 23b provided in the outer section component 23, and partition the vehicle width inner side of the closed cross-sectional space 4s by the vertical wall 22a provided in the inner section component 24.

However, as illustrated in FIG. 3, FIGS. 6A, 6B, and FIG. 7, in the closed cross-sectional space 4s of the side sill 4, each of the sections 21F, 21R, 22F, 22R is formed with a clearance portion 25 in a recessed shape for an opposing inner surface of the side sill 4 in the cross-sectional view that is perpendicular to the vehicle longitudinal direction.

In the present example, the clearance portion 25 is formed in the vertical wall 22a in the pillar front section 22F and the pillar rear section 22R, and is formed in the front wall 23a and the rear wall 23b of the outer section component 23 in the pillar forward section 21F and the pillar rearward section 21R. Each of the clearance portions 25 is formed in the recessed shape in the cross-sectional view that is perpendicular to the vehicle longitudinal direction in a manner to separate from a corner portion between the outer wall 42c of the second member 42 and the lower wall 43a of the third member 43 in the side sill 4.

In the closed cross-sectional space 4s, a communicating portion 25H (a space) that communicates between a space in front of each of the sections 21F, 21R, 22F, 22R and a space behind each thereof is formed between the clearance portion 25 formed in each of the sections 21F, 21R, 22F, 22R and the inner surface of the side sill 4 that the clearance portion 25 opposes.

In this way, the electrodeposition liquid can flow between the space on one side and the space on the other side of each of the sections 21F, 21R, 22F, 22R through the communicating portion 25H, and the unillustrated corrosion inhibitor spray gun, which is inserted in the closed cross-sectional space 4s from the through hole 47 provided in the lower wall 43a of the side sill 4, can spray the corrosion inhibitor from the space on the side where the spray gun is inserted to the space on the other side from specified one of the sections 21F, 21R, 22F, 22R through the communicating portion 25H.

As illustrated in FIG. 3, FIG. 5, and FIG. 7, the side sill outer 4o, which is constructed of the second member 42 and the third member 43, is provided with first reinforcing members 30U, 30D and a second reinforcing member 31 reinforcing bending rigidity against the load toward the vehicle width inner side.

The first reinforcing members 30U, 30D are the first upper reinforcing member 30U located in an upper portion of the side sill 4 and the first lower reinforcing member 30D located in a lower portion of the side sill 4.

The first upper reinforcing member 30U is joined to the side sill 4 at a height position of a center pillar joined portion 4A.

As illustrated in FIG. 3 and FIG. 7, the first lower reinforcing member 30D is joined to the side sill 4 at a position lower than the height position of the center pillar joined portion 4A.

As illustrated in FIG. 3, each of these first upper reinforcing member 30U and first lower reinforcing member 30D continuously extends in the vehicle longitudinal direction from a position in front of the center pillar 5 to a rear portion of the side sill 4 in a manner to cross the center pillar 5 along the longitudinal direction of the side sill 4.

As illustrated in FIG. 1, the above-described second reinforcing member 31 is provided in the rear portion of the side sill 4 and extends upward along a rear wheel house 90 from the rear portion of the side sill 4.

As illustrated in FIG. 1, FIG. 2, and FIG. 3, the above-described center pillar 5 includes the pillar inner 51 and a pillar outer 52 and is vertically provided from the side sill 4 by joining lower portions of these to the side sill 4. A lower portion of the center pillar 5 (a root region for the side sill 4) is formed such that a width thereof in the vehicle longitudinal direction is gradually increased downward from a portion near an upper end of the lower portion (that is, a boundary portion 52a described below (see FIG. 1 and FIG. 3)) to the upper end of the side sill 4.

As illustrated in FIG. 2, the pillar inner 51 is formed in a vertical wall shape (a substantially flat plate shape) in which the substantially entire portion in the vertical direction extends in the vehicle width direction, and is formed with a flange 51d on each of front and rear sides thereof.

As illustrated in FIG. 1 to FIG. 3, the pillar outer 52 is integrally formed by including an outer wall 52b extending in the vertical direction and the vehicle width direction, front and rear vertical walls 52c extending to the vehicle width inner side from front and rear ends of the outer wall 52b, a flange 52d on each of the front and rear sides formed along the vertical wall 52c such that the substantially entire portion in the vertical direction has a hat-shaped cross-sectional shape opened to the vehicle width inner side in the cross-sectional view that is perpendicular to the vertical direction.

The center pillar 5 is configured to have a closed cross-sectional space 5s extending in the vertical direction between the pillar inner 51 and the pillar outer 52 by joining the front edge flanges 51d, 52d and the rear edge flanges of the pillar inner 51 and the pillar outer 52.

As illustrated in FIG. 1, a lower portion of the pillar outer 52 is joined to the second member 42 of the side sill 4, and this joint structure will be described.

As illustrated in FIG. 1 and FIG. 5, the lower portion of the pillar outer 52 is formed with a lower end flange 52e extending downward from a lower end of the outer wall 52b, and this lower end flange 52e is joined to the outer wall 42c of the second member 42 in the side sill 4. In this way, as illustrated in FIG. 1, the center pillar 5 and the side sill 4 are arranged such that the outer wall 52b and the outer wall 42c are substantially flush in the vehicle width direction. In addition, each of the front and rear flanges 52d of the pillar outer 52 and each of the front and rear flanges 51d of the pillar inner 51 are integrally joined to each other as described above. As illustrated in FIG. 2, lower portions of these flanges 51d, 52d on each of the front and rear sides are integrally joined to each other in a state of holding the upper end flange 42a of the second member 42 on a side of the side sill outer 4o from both of the inner and outer sides in the vehicle width direction. In this way, the front and rear flanges 51d, 52d of the center pillar 5 and the upper end flange 42a of the side sill 4 are arranged to be substantially flush in the vehicle width direction.

In this state, as illustrated in FIG. 1, the vertical wall 52c on each of the front and rear sides of the pillar outer 52 is brought into a state where a lower end thereof contacts the upper wall 42b of the second member 42 in the side sill 4, and each of the front and rear vertical walls 52c extending in the vertical direction and the upper wall 42b, which extends in the longitudinal direction, in the second member 42 of the side sill 4 continuously and smoothly extend in a corner portion of these in a vehicle side view.

As illustrated in FIG. 1 and FIG. 3, the pillar outer 52 includes two members that are a pillar outer upper 53 located in an upper portion and an intermediate portion and a pillar outer lower 54 located in a lower portion. The pillar outer upper 53 and the pillar outer lower 54 are integrally joined to each other by a known tailor welded blank method or the like in which an end surface at an upper end of the pillar outer lower 54 and an end surface at a lower end of the pillar outer upper 53 abut and are welded to each other.

The boundary portion 52a between the pillar outer upper 53 and the pillar outer lower 54 is located above the upper end of the side sill 4, and is located in or near an upper end portion (a boundary portion between a straight portion and a wide portion in the vehicle side view) of the lower portion, which is widened downward, below the upper portion and the intermediate portion in the vertical direction of the pillar outer 52.

The center pillar 5 is formed such that an upper direct upward portion 53d located above a direct upward portion 54u, which is located immediately above the side sill 4, in the vertical direction of the center pillar 5 has the higher rigidity against a load applied to the center pillar 5 in a direction toward the vehicle width inner side than the direct upward portion 54u.

In other words, the direct upward portion 54u is formed to have the relatively lower rigidity against (be crushed more easily by) the load applied to the center pillar 5 in the direction toward the vehicle width inner side than the upper direct upward portion 53d.

In the present example, the pillar outer 52 is formed such that the pillar outer upper 53, which is located at a corresponding height to the upper direct upward portion 53d of the center pillar 5, has a greater plate thickness than the pillar outer lower 54, which is located at a corresponding height to the direct upward portion 54u of the center pillar 5. In this way, the upper direct upward portion 53d is formed to have the higher rigidity against the load toward the vehicle width inner side than the direct upward portion 54u.

A configuration of promoting crushing of the direct upward portion 54u at the time when the load toward the vehicle width inner side is applied to the center pillar 5 during the lateral collision is not limited to the configuration as described above in which the pillar outer upper 53 is formed to have the greater plate thickness than the pillar outer lower 54 and the pillar outer lower 54 thereby has the relatively low rigidity, but may be formed by a method as described in JP 2010-173562A.

The pillar inner 51 is formed such that the lower portion thereof is widened in the vehicle longitudinal direction so as to correspond to the lower portion of the pillar outer 52, and is formed with the extending portion 55 that extends to be lower than a position of the upper end of the side sill 4 and the pillar outer 52.

More specifically, as illustrated in FIG. 2 and FIG. 5, in the center pillar arrangement region 4Ra in the vehicle longitudinal direction of the side sill 4, the extending portion 55 is disposed in the closed cross-sectional space 4s in a manner to partition the closed cross-sectional space 4s into spaces on the inner and outer sides in the vehicle width direction. As illustrated in FIG. 2, an upper end 55u of the extending portion 55 is interposed between the upper end flanges 41a, 42a of the first member 41 and the second member 42 in the side sill 4 and is integrally joined to these upper end flanges 41a, 42a. Furthermore, a lower end 55d of the extending portion 55 is interposed between the lower end flanges 41e, 43b of the first member 41 and the third member 43 in the side sill 4 and is integrally joined to these lower end flanges 41e, 43b.

Note that as described above, the lower portion of the pillar inner 51 including the extending portion 55 is formed to be wide in the vehicle longitudinal direction.

Figure 4:
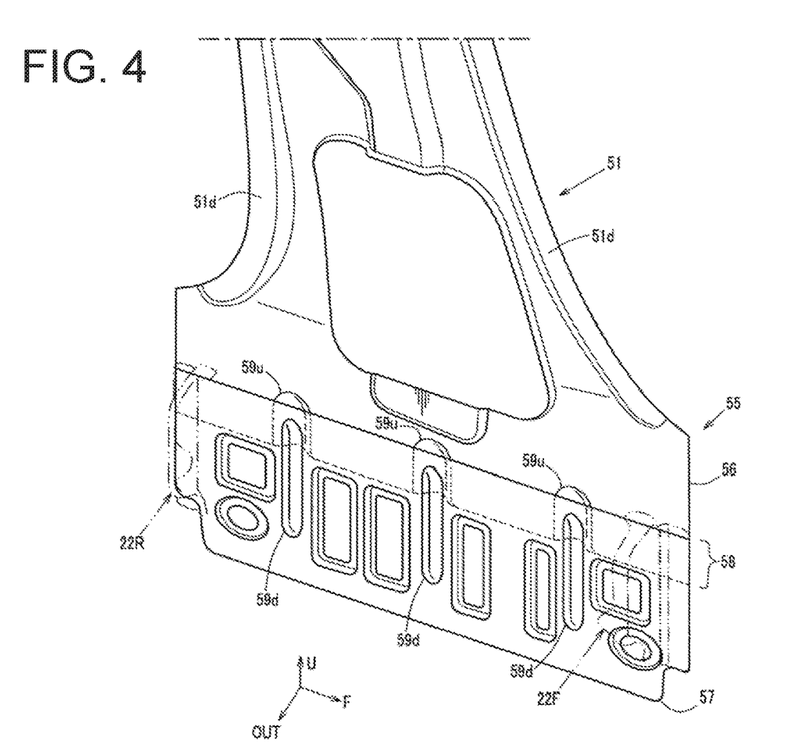
FIG. 4 is a perspective view in which a lower portion of the pillar inner is seen from a vehicle width outer side.

In addition, as illustrated in FIG. 2, FIG. 4, and FIG. 5, the pillar inner 51 has two members that are a pillar inner upper 56 and a pillar inner lower 57 provided below the pillar inner upper 56. A lower portion of the pillar inner upper 56 and an upper portion of the pillar inner lower 57 overlap each other in the vehicle side view (that is, in the vehicle width direction) in the closed cross-sectional space 4s of the side sill 4. That is, an overlapping portion 58 between the lower portion of the pillar inner upper 56 and the upper portion of the pillar inner lower 57 is provided in the above-described extending portion 55, and the lower portion of the pillar inner upper 56 and the upper portion of the pillar inner lower 57 are joined to each other at a plurality of positions along the vehicle longitudinal direction of the extending portion 55 by spot welding or the like (indicated by an "x" in FIG. 2).

As illustrated in FIG. 2, FIG. 4, and FIG. 5, at least in the overlapping portion 58 of the extending portion 55, the lower portion of the pillar inner upper 56 and the upper portion of the pillar inner lower 57 are respectively provided with beads 59u, 59d, each of which extends in the vertical direction and is projected to the vehicle width inner side (that is, recessed when seen from the vehicle width outer side).

In the overlapping portion 58, the beads 59u, 59d in the lower portion of the pillar inner upper 56 and the upper portion of the pillar inner lower 57 are formed at mutually overlapping positions in the vehicle width direction. That is, in the overlapping portion 58, the bead 59d of the pillar inner lower 57 located on the vehicle width outer side is fitted to the bead 59u in the lower portion of the pillar inner upper 56 located on the vehicle width inner side from the vehicle width outer side. In this way, in the vehicle width direction, a recessed vehicle width outer surface of the bead 59u on the pillar inner upper 56 side opposes a projected vehicle width inner surface of the bead 59d on the pillar inner lower 57 side in the vehicle width direction.

In the overlapping portion 58, the beads 59u, 59d in the lower portion of the pillar inner upper 56 and the upper portion of the pillar inner lower 57 are provided at a plurality of positions in a manner to separate from each other in the vehicle longitudinal direction. In the present example, the beads 59u, 59d are provided at three positions in total that are an intermediate position of the extending portion 55 in the vehicle longitudinal direction and positions away therefrom on front and rear sides.

As illustrated in FIG. 5, in the closed cross-sectional space 4s of the side sill 4, the pillar front section 22F and the pillar rear section 22R described above are provided on the vehicle width outer side of the extending portion 55. As illustrated in FIG. 4 and FIG. 5, the pillar front section 22F and the pillar rear section 22R are respectively provided on a front end side of the extending portion 55 and a rear end side of the extending portion 55 in a manner to separate from each other in the vehicle longitudinal direction.

That is, as illustrated in FIG. 5, the outer end flanges 22b, 22b of the pillar front section 22 and the pillar rear section 22R are joined to an inner surface, which faces the closed cross-sectional space 4s, in the outer wall bead 42cc of the outer wall 42c in the side sill 4. Meanwhile, the inner end flanges 22c, 22c of the pillar front section 22 and the pillar rear section 22R are joined to the extending portion 55.

However, as illustrated in FIG. 4 and FIG. 5, the inner end flanges 22c, 22c are at least joined to the overlapping portion 58 in the extending portion 55. As described above, the overlapping portion 58 is arranged such that, of the pillar inner upper 56 and the pillar inner lower 57, the pillar inner lower 57 is located on the vehicle width outer side. In this way, only the pillar inner lower 57 is joined to the inner end flanges 22c, 22c of the pillar front section 22 and the pillar rear section 22R.

The vehicle side body structure in this embodiment described above is the vehicle side body structure that includes: the side sill 4 that has the closed cross-sectional space 4s (see FIG. 5) extending in the vehicle longitudinal direction (a closed cross-sectional structure); and the center pillar 5 that has the closed cross-sectional space 5s (see FIG. 2) extending upward from the side sill 4 (the closed cross-sectional structure) and is formed with the front and rear entry and exit openings 2f, 2r as the openings formed to be opened at the positions above the side sill 4 and behind the center pillar 5. As illustrated in FIG. 2, the center pillar 5 includes the pillar inner 51 and the pillar outer 52. The pillar inner 51 has the pillar inner upper 56 and the pillar inner lower 57 provided on the lower side of the pillar inner upper 56. In the center pillar arrangement region 4Ra, in which the center pillar 5 is located, in the longitudinal direction of the side sill 4, the pillar inner upper 56 and the pillar inner lower 57 overlap each other in the vehicle side view in the closed cross-sectional space 4s (on the inside of the closed cross-section) of the side sill 4 (see FIG. 2 and FIG. 5). Furthermore, as illustrated in FIG. 5, the closed cross-sectional space 4s includes the pillar front section 22F and the pillar rear section 22R, each of which partitions the closed cross-sectional space 4s in the longitudinal direction. The pillar front section 22F and the pillar rear section 22R are joined to the overlapping portion 58 between the pillar inner upper 56 and the pillar inner lower 57 and the inner surface, which faces the closed cross-sectional space 4s, in the side sill 4 (see FIG. 5).

With the above configuration, the overlapping portion 58 between the pillar inner upper 56 and the pillar inner lower 57, the pillar front section 22F, and the pillar rear section 22R are provided in the closed cross-sectional space 4s of the side sill 4, and, in the closed cross-sectional space 4s, the pillar front section 22F and the pillar rear section 22R are joined to the overlapping portion 58 and the inner surface, which faces the closed cross-sectional space 4s, in the side sill 4. As a result, during the lateral collision, the load toward the vehicle width inner side applied to the side sill 4 can be received not only by the center pillar arrangement region 4Ra of the side sill 4 but also by a wide area including portions therearound on the front and rear sides. Thus, it is possible to suppress bending of the center pillar arrangement region 4Ra in the side sill 4 to the vehicle width inner side.

Furthermore, even in the case where bending deformation of the side sill 4 occurs due to the load toward the vehicle width inner side, the center pillar arrangement region 4Ra of the side sill 4 is not deformed to have a V-shape, which is projected to the vehicle width inner side, in the plan view but can be deformed in a trapezoidal shape in the plan view formed by displacement of the wide area, which includes the portions around the center pillar arrangement region 4Ra on the front and rear sides, to the vehicle width inner side.

That is, compared to the case where the center pillar arrangement region 4Ra of the side sill 4 is deformed in the former shape, the deformation thereof in the latter shape can reduce a maximum amount of entry of the side sill 4 to the vehicle width inner side.

In addition, in order to receive the load toward the vehicle width inner side by the center pillar arrangement region 4Ra in the side sill 4 during the lateral collision, the overlapping portion 58, which is constructed of the pillar inner upper 56 and the pillar inner lower 57 as components of the center pillar 5, is used. In this way, it is possible to securely receive the load toward the vehicle width inner side without a need for additionally providing a reinforcing member or the like. The overlapping portion 58 is provided in the closed cross-sectional space 4s, and with the pillar front section 22F and the pillar rear section 22R, the overlapping portion 58 receives the load toward the vehicle width inner side. Accordingly, in the closed cross-sectional space 4s, the pillar front section 22F and the pillar rear section 22R do not have to be provided in a manner to close the entire cross-section of the closed cross-sectional space 4 in the longitudinal direction. Thus, it is possible to suppress an increase in size of each of the pillar front section 22F and the pillar rear section 22R.

Therefore, it is possible to improve the bending rigidity against the load toward the inner side in the vehicle width direction during the lateral collision while suppressing a weight increase of the side sill 4.

As an aspect of the present invention, as illustrated in FIG. 2 and FIG. 5, the overlapping portion 58 has a length in the vehicle longitudinal direction that corresponds to the center pillar arrangement region 4Ra. As illustrated in FIG. 4 and FIG. 5, the pillar front section 22F and the pillar rear section 22R are separately provided on the front and rear sides of the overlapping portion 58, are also provided on the vehicle width outer side of the overlapping portion 58, and are only joined to the pillar inner lower 57, which is the member located on the vehicle width outer side in the overlapping portion 58, among the pillar inner upper 56 and the pillar inner lower 57.

With the above configuration, when the load toward the vehicle width inner side is applied to the side sill 4 from the vehicle width outer side during the lateral collision, the side sill outer 4o pushes at least the overlapping portion 58 of the extending portion 55 to the vehicle width inner side via the pillar front section 22F and the pillar rear section 22R.

Thus, in the present example, as described above, the pillar front section 22F and the pillar rear section 22R are only joined to the pillar inner lower 57, which is located on the vehicle width outer side in the overlapping portion 58, among the pillar inner upper 56 and the pillar inner lower 57. In this way, during the lateral collision, the pillar front section 22F and the pillar rear section 22R can press the pillar inner lower 57, which is located on the vehicle width outer side in the overlapping portion 58, to the side of to the pillar inner upper 56, which is located on the vehicle width inner side.

That is, it is possible to press the overlapping portion 58 in a direction in which the pillar inner upper 56 and the pillar inner lower 57 overlap each other in the vehicle width direction, that is, in a direction to increase a joint force therebetween by the pillar front section 22F and the pillar rear section 22R using the load toward the vehicle width inner side applied to the side sill 4 during the lateral collision.

Therefore, during the lateral collision, the pillar front section 22F, the pillar rear section 22R, and the overlapping portion 58 can securely support the side sill 4 against the load toward the vehicle width inner side so as to prevent displacement of the side sill 4 to the vehicle width inner side.

In addition, the pillar front section 22F and the pillar rear section 22R are separately provided on the front and rear sides of the overlapping portion 58, which has the length corresponding to the center pillar arrangement region 4Ra in the vehicle longitudinal direction. Thus, during the lateral collision, the overlapping portion 58, which is formed to be wide in the vehicle longitudinal direction, can be used to receive the load toward the vehicle width inner side, which is applied from the pillar front section 22F and the pillar rear section 22R provided on the front and rear sides of the overlapping portion 58, in a well-balanced manner.

As an aspect of the present invention, as illustrated in FIG. 2, FIG. 4, and FIG. 5, the pillar inner upper 56 and the pillar inner lower 57 are respectively provided with the beads 59u, 59d, each of which is projected in the vehicle width direction, at least in the overlapping portion 58. At overlapping positions in the vehicle side view, the beads 59u, 59d of the pillar inner upper 56 and the pillar inner lower 57 are formed in the mutually overlapping shapes in the vehicle width direction.

With the above configuration, it is possible to improve the rigidity of the overlapping portion 58 against the load toward the inner side in the vehicle width direction during the lateral collision by forming the beads 59u, 59d in the overlapping portion 58.

The present invention is not limited to the configuration in the above-described embodiment, but can be implemented in various embodiments.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS 2f, 2r: Front or rear entry and exit opening (opening)
4s: Closed cross-sectional space
4: Side sill
4o: Side sill outer (an inner surface of side sill facing inside of closed cross-section)
4Ra: Center pillar arrangement region
5: Center pillar
5s: Closed cross-sectional space (inside of closed cross-section)
22F: Pillar front section (section)
22R: Pillar rear section (section)
51: Pillar inner
52: Pillar outer
56: Pillar inner upper
57: Pillar inner lower
58: Overlapping portion
59u, 59d: Bead

The invention claimed is:

1. A vehicle side body structure, comprising:
a side sill that has a closed cross-sectional structure extending in a vehicle longitudinal direction; and
a center pillar that has a closed cross-sectional structure extending upward from the side sill, and being formed with an opening at a position above the side sill and on each of front and rear sides of the center pillar, wherein
the center pillar includes a pillar inner and a pillar outer, the pillar inner formed in a vertical wall shape that is in a substantially flat plate shape in which a substantially entire portion in a vertical direction extends in a vehicle width direction,
the pillar inner has a pillar inner upper and a pillar inner lower provided on a lower side of the pillar inner upper,
in a longitudinal direction of the side sill, in a center pillar arrangement region where the center pillar is located, a lower portion of the pillar inner upper and an upper portion of the pillar inner lower overlap each other on an inside of a closed cross-section of the side sill in a vehicle side view,
a section that partitions the inside of the closed cross-section in the longitudinal direction is provided on the inside of the closed cross-section, and
the section is joined to an overlapping portion between the pillar inner upper and the pillar inner lower and to an inner surface, which faces the inside of the closed cross-section, in the side sill, wherein
in the longitudinal direction of the side sill, the overlapping portion at least has a length in the vehicle longitudinal direction that corresponds to the center pillar arrangement region,
the section is one of a plurality of sections separately provided on front and rear sides of the overlapping portion, and
each of the plurality of sections is provided on an outer side of the overlapping portion in the vehicle width direction and, of the pillar inner upper and the pillar inner lower, is only joined to a member located on the outer side of the overlapping portion in the vehicle width direction.

2. The vehicle side body structure according to claim 1, wherein
at least in the overlapping portion, each of the pillar inner upper and the pillar inner lower is provided with a bead in a shape to be projected in the vehicle width direction, and
the beads of the pillar inner upper and the pillar inner lower are formed at overlapping positions in the vehicle side view to have shapes to be projected in the same direction in the vehicle width direction.

3. The vehicle side body structure according to claim 1, wherein the section is joined to the pillar inner lower, which is the member located on the outer side of the overlapping portion in the vehicle width direction.

4. The vehicle side body structure according to claim 2, wherein in the overlapping portion, the bead of the pillar inner lower located on a vehicle width outer side is fitted to the bead in the lower portion of the pillar inner upper located on a vehicle width inner side from the vehicle width outer side.

5. The vehicle side body structure according to claim 4, wherein each of the beads extends in the vertical direction and is projected to the vehicle width inner side.

6. The vehicle side body structure according to claim 2, wherein each of the beads extends in the vertical direction and is projected to a vehicle width inner side.

7. The vehicle side body structure according to claim 2, wherein in the overlapping portion, the bead in the lower portion of the pillar inner upper and the bead in the upper portion of the pillar inner lower are provided at a plurality of positions so as to separate the bead in the lower portion from the bead in the upper portion in the vehicle longitudinal direction.

8. The vehicle side body structure according to claim 4, wherein in the overlapping portion, the bead in the lower portion of the pillar inner upper and the bead in the upper portion of the pillar inner lower are provided at a plurality of positions so as to separate the bead in the lower portion from the bead in the upper portion in the vehicle longitudinal direction.

9. The vehicle side body structure according to claim 5, wherein in the overlapping portion, the bead in the lower portion of the pillar inner upper and the bead in the upper portion of the pillar inner lower are provided at a plurality of positions so as to separate the bead in the lower portion from the bead in the upper portion in the vehicle longitudinal direction.

10. The vehicle side body structure according to claim 6, wherein in the overlapping portion, the bead in the lower portion of the pillar inner upper and the bead in the upper portion of the pillar inner lower are provided at a plurality of positions so as to separate the bead in the lower portion from the bead in the upper portion in the vehicle longitudinal direction.

11. The vehicle side body structure according to claim 3, wherein the section is configured to a pillar front section and a pillar rear section, which are separately provided on the front and rear sides of the overlapping portion, are also provided on a vehicle width outer side of the overlapping portion, and are only joined to the pillar inner lower, which is the member located on the outer side of the overlapping portion in the vehicle width direction, among the pillar inner upper and the pillar inner lower.

12. The vehicle side body structure according to claim 11, wherein
the side sill comprises a side sill outer and a side sill inner; and
the pillar front section is disposed on the vehicle width outer side of the closed cross-sectional structure of the side sill and only on a side of the side sill outer among the side sill outer and the side sill inner, and is integrally formed by including a vertical wall that partitions the closed cross-sectional structure in the vehicle longitudinal direction, an outer end flange extending rearward from a vehicle width outer end of the vertical wall, an inner end flange extending forward from a vehicle width inner end of the vertical wall, and an upper end flange extending rearward from an upper end of the vertical wall.

13. The vehicle side body structure according to claim 12, wherein the outer end flange is joined to an outer wall bead in an outer wall of a second member in the side sill, the upper end flange is joined to an upper wall of the second member in the side sill, and the inner end flange is joined to a lower portion of the pillar inner.

* * * * *